Dec. 22, 1936.  N. M. FAULDS  2,065,271
FRUIT JUICE EXTRACTOR
Filed Dec. 1, 1933  6 Sheets-Sheet 5

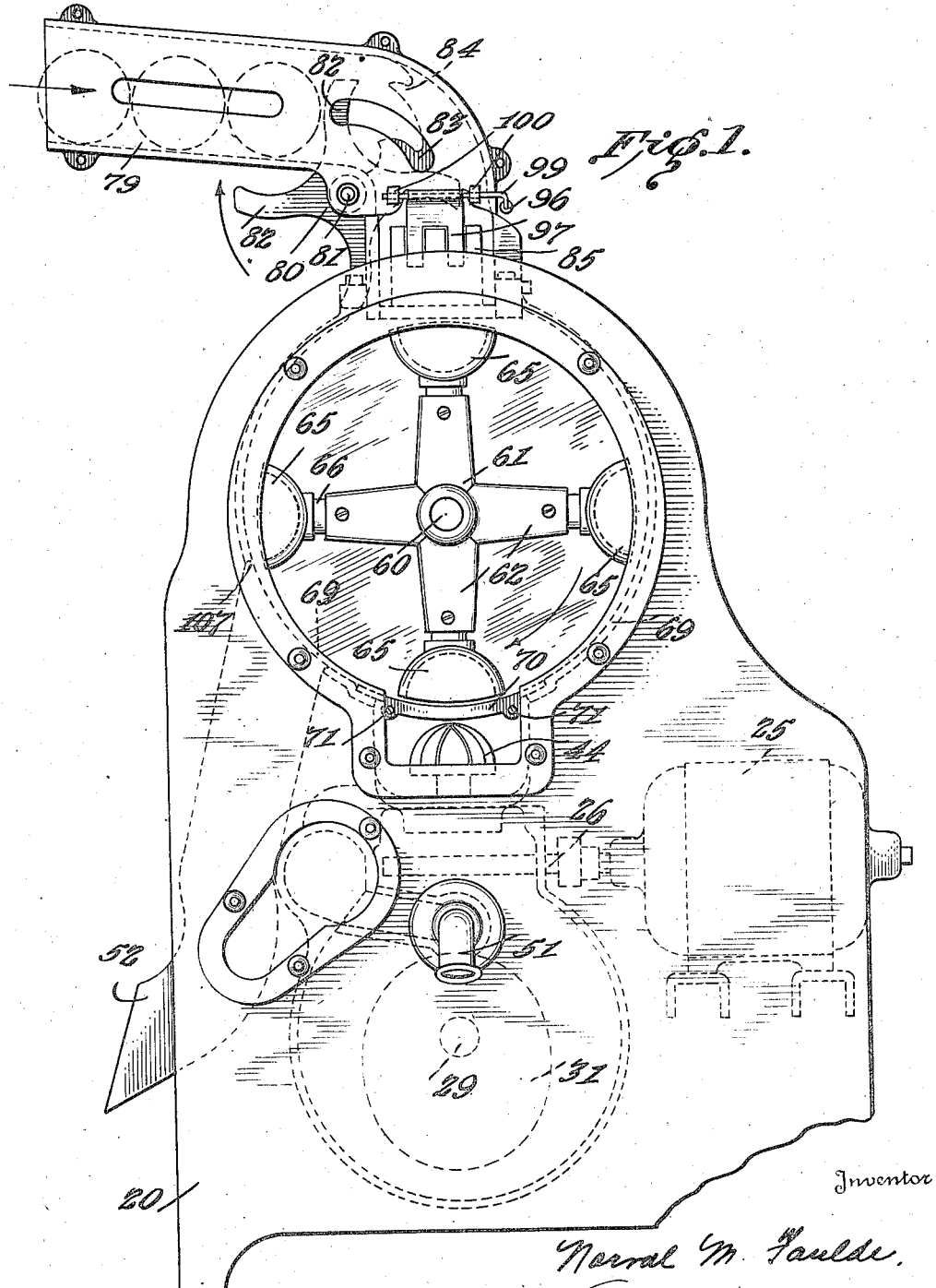

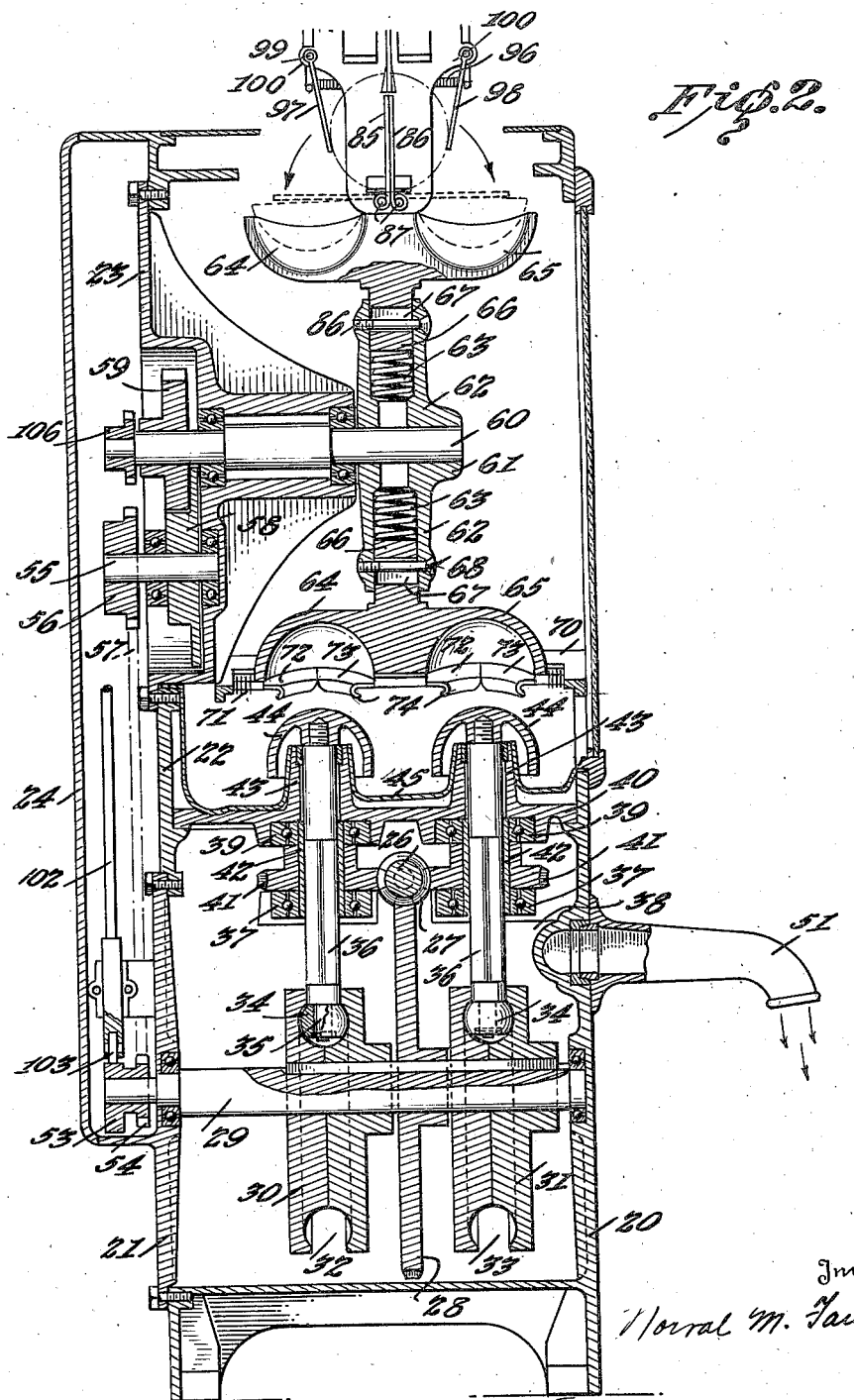

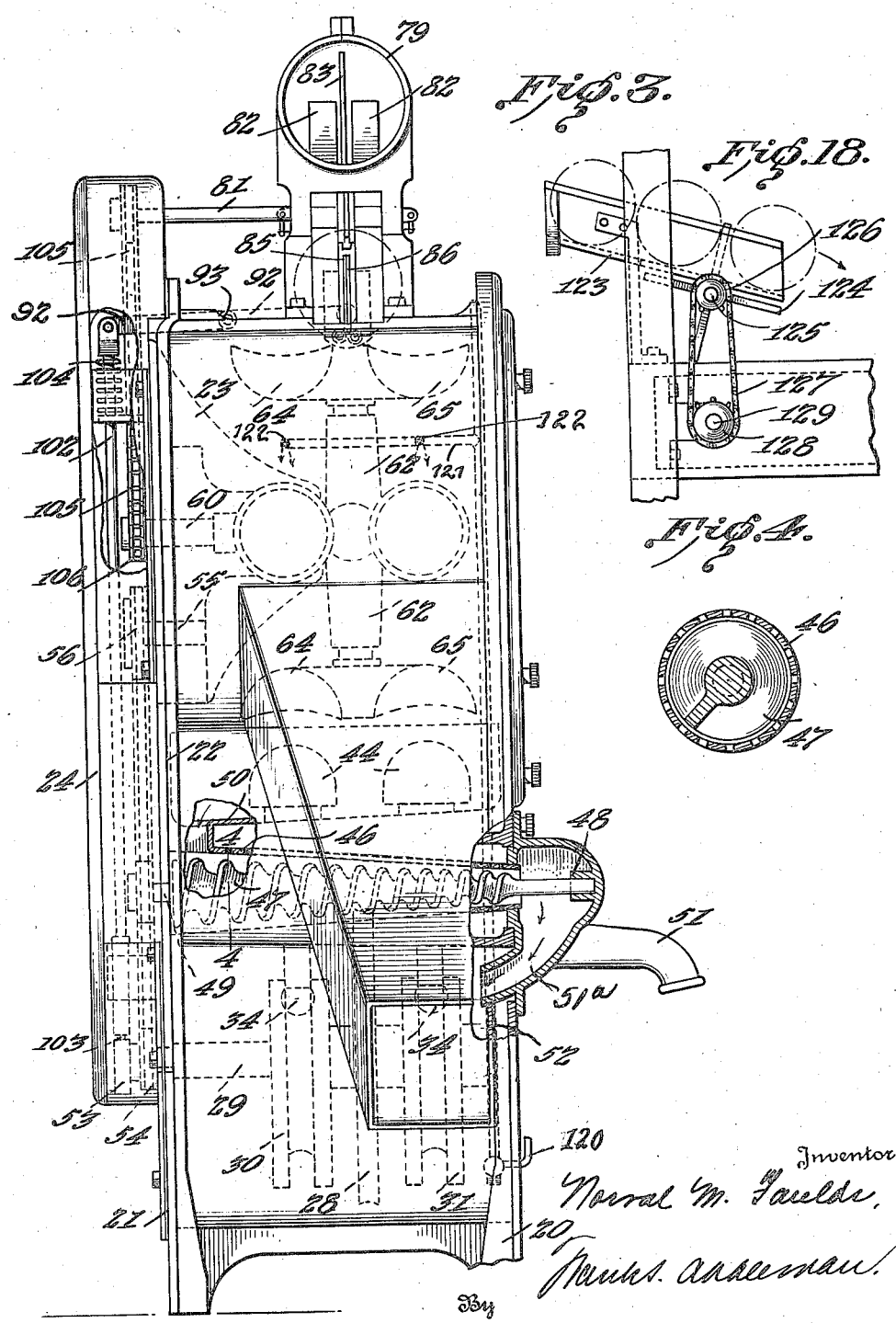

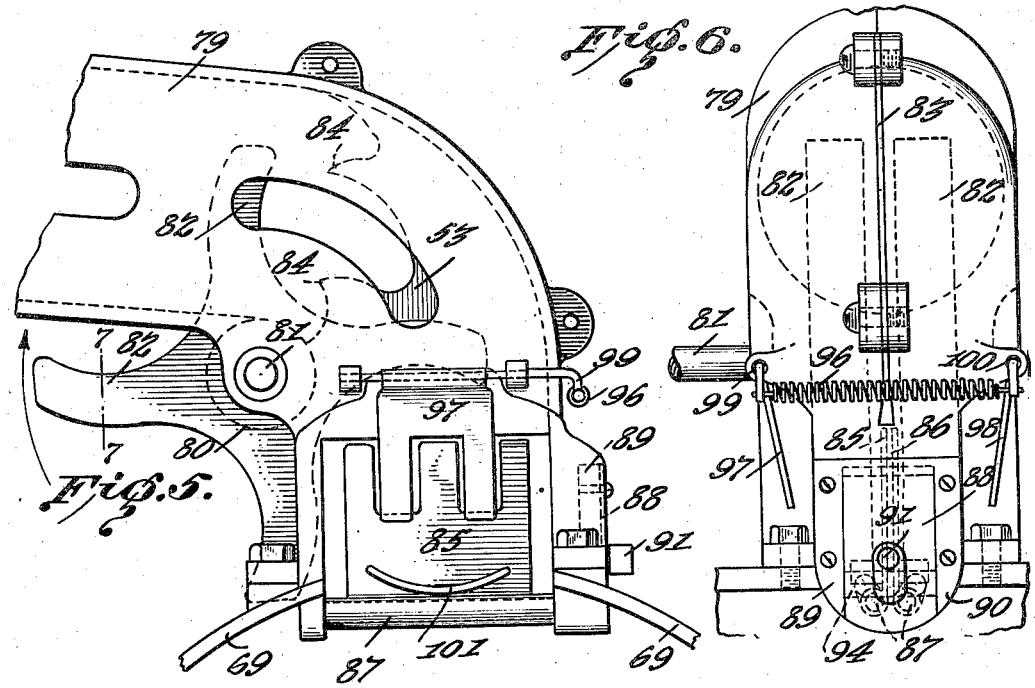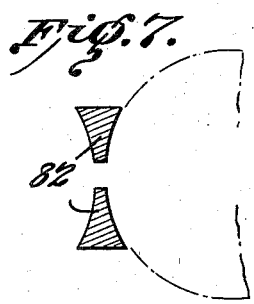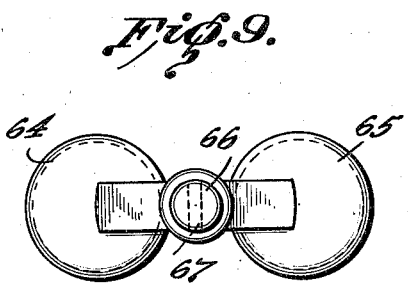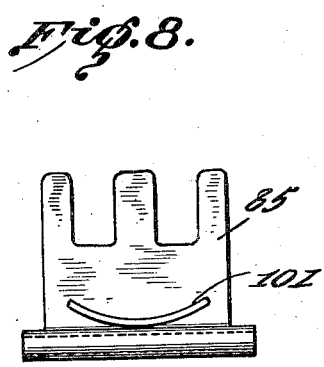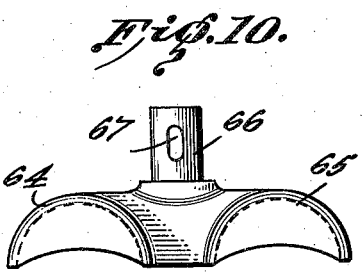

Inventor
Norval M. Faulds,
By Chas. Appleman
Attorney

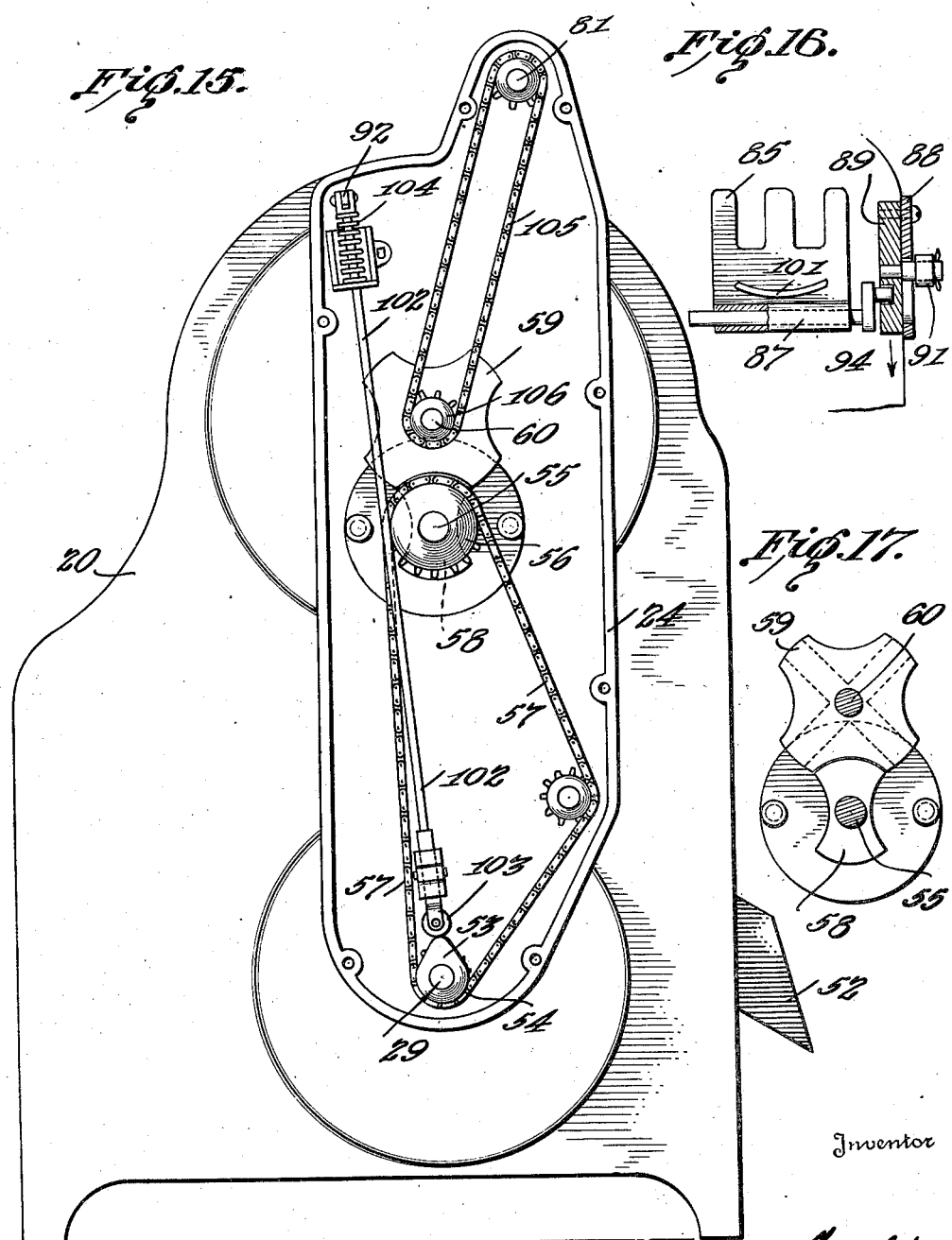

Patented Dec. 22, 1936

2,065,271

UNITED STATES PATENT OFFICE 2,065,271

FRUIT JUICE EXTRACTOR

Norval M. Faulds, Clearwater, Fla.

Application December 1, 1933, Serial No. 700,559

3 Claims. (Cl. 146—3)

This invention relates to fruit juice extractors, and particularly to those of the commercial type designed to operate automatically for cutting fruit successively and to subject two halves of the fruit to the action of juice expellers or removers and then discharge the skins of the fruit and the juices to locations externally of the frame or casing of the machine.

It is an object of this invention to provide continuously driven reamers and novel means driven from a source of power for forcing the fruit into contact with a knife which severs it, the severed portions being held against dislodgment until means are actuated for overcoming the tension of the retaining devices and delivering the sections of the fruit to carriers by which they are brought into position to be subjected to the action of the reamers.

It is furthermore an object of the invention to provide novel means whereby the fruit carriers are intermittently moved and come to rest in the zone of action of the reamers and whereby during such interrupted motion of the carriers the reamers are actuated to approach the carriers, while at the same time the said reamers are rotated.

It is a still further object of the invention to provide novel means for treating the juices and contents of the fruit which are dislodged or expelled by the reamers, whereby the juices are collected free of seeds or roughage which may be dislodged by the reamers, novel means being provided for collecting the seeds and roughage and the juices.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of the front of a juice extractor embodying the invention;

Figure 2 illustrates a sectional view through the center of the machine;

Figure 3 illustrates a view in elevation of that portion of the machine at right angles to the portion shown in Fig. 1;

Figure 4 illustrates a sectional view on the line 4—4 of Fig. 3;

Figure 5 illustrates a detail view of the fruit delivering and cutting mechanism;

Figure 6 illustrates a view in elevation of the front of that portion shown in Fig. 5;

Figure 7 illustrates a sectional view on the line 7—7 of Fig. 5;

Figure 8 illustrates a detail view of one of the elements of the fruit delivering means;

Figure 9 illustrates an underneath plan view of two of the fruit cups and the mounting therefor;

Figure 10 illustrates a side elevation thereof;

Figure 15 illustrates a view in elevation of the rear of the machine with the back plate removed;

Figure 16 illustrates a detailed view, partly in section, of the fruit flipper with its operating mechanism partly in section;

Figure 17 illustrates a view in elevation of the Geneva movement; and

Figure 18 illustrates a detail view of a modified feeding assembly.

Figure 11:
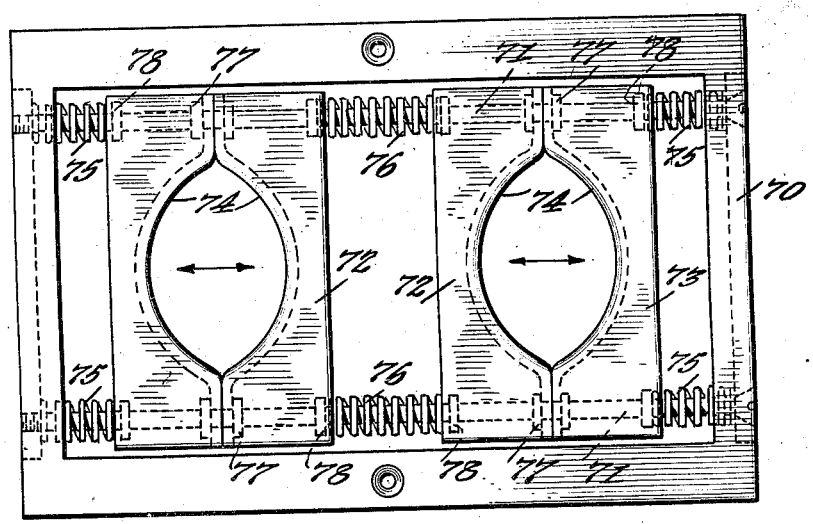
Figure 11 illustrates a plan view of the fruit supporting shutters.

The machine has a base frame 20 and a removable plate 21 and sectional frame members 22 and 23, together with a suitable housing, such as 24. The structural features of the frame and housing may be changed to suit particular requirements and it is believed unnecessary to describe the members or their means of assembly which, however, are well illustrated in Fig. 2.

A motor 25 is suitably supported and the drive shaft 26 thereof has a worm 27 which is engaged by a worm wheel 28 on a shaft 29, which is mounted in appropriate bearings in the base frame 20 and plate 21.

Cams 30 and 31 are mounted on the shaft 29 and they have peripheral channels 32 and 33, respectively, in which rollers or balls 34 are seated, the said rollers being mounted on studs 35 of shafts 36. It is obvious that the shafts for the reamers, to be presently described, are duplicated and the parts for operating them are likewise duplicated so that they will be described with this in view. Each shaft 36 has a bearing 37 on a suitable support 38 and a bearing 39 thereabove which is held by a breast or partition plate 40. A worm wheel 41 is secured to a sleeve 42 fast to the rotatable parts of the aforesaid bearings and each shaft 36 is splined in a sleeve. Each worm wheel meshes with the worm 27 so that the shafts 36 are rotated while they are being reciprocated under the influence of the cams.

The breast plate 40 is provided with hollow bosses 43 which are elevated to a suitable extent, and the shafts 36 have their upper ends in practical alinement with the upper surfaces of the bosses when the said shafts are in their lowermost positions. The upper ends of the said shafts are provided with reamers of any appropriate type as shown at 44. A pan or receptacle 45 has upstanding portions which fit over the bosses 43 and by this means the juices dislodged by the reamers collect in the pan and gravitate to a discharge spout at the rear side of the machine, the said discharge spout being in communication with a conical strainer 46 which extends from one side of the machine to the other. A screw conveyer 47 rotates in the strainer and is suspended therein by reason of the fact that its ends are mounted in bearings 48 and 49. The strainer is supported in a pan or juice collector 50 whose bottom is on an incline so that the juices which are free of seeds and pulp gravitate to and through the spout 51, whereas the seeds and pulp which are conveyed through the strainer by the screw are delivered through a passage 51ª to a chute 52 through which the fruit skins find their exit from the interior of the machine, as will presently appear.

The shaft 29 is provided with a cam 53 and a sprocket wheel 54. A stub shaft 55 is mounted in suitable bearings and a sprocket wheel 56 on the shaft is engaged by a sprocket chain 57 which is driven from the sprocket wheel 54. The shaft 55 has one member 58 of a Geneva wheel secured to rotate with it and the other member 59 of the said Geneva wheel is secured on a shaft 60 suitably journaled in the frame.

A hub 61 on the shaft 60 has hollow spokes 62 and a spring 63 is seated in the inner end of each spoke. Two fruit cups 64 and 65 are carried by each of the spokes, in the present embodiment of the invention, and the said fruit cups have shanks 66 whose inner end engages one of the springs, which springs are operative to force the shanks normally outward. Each shank has a slot 67 through which a pin 68 extends, each of said pins being anchored to a spoke so that the shanks are limited in their movement although they may reciprocate in the spokes to a limited degree.

The fruit cups are encompassed by a breast plate 69 which is in such relation to the cups as to confine the fruit delivered to them so that dislodgment of the fruit is prevented while it is being carried to the reamers.

The breast plate is interrupted at a location above the reamers and the space between the interrupted portions of the breast plate is occupied by a frame 70, longitudinally of which, near each side, rods 71 are supported. Fruit supporting shutters 72 and 73 arranged in pairs are slidably supported by the rods and the said pairs of shutters have oppositely curved edges which form clearances for the entrance of the reamers as they are moved upwardly into operative relation with the cups. The curved edges of the shutters are furthermore shaped to form curved flanges 74 whose outer surfaces are engaged by the reamers as they are moved upwardly so that the said reamers cam over the curved edges and cause the shutters of each pair to move apart to produce a clearance for the reamers as they operate on the fruit carried by the cups.

Pairs of springs 75 and 76 on the rods 71 serve to force the shutters normally toward each other and return them to normal position after the reamers have descended during their cycle of operation. Each shutter is provided with guide rings 77 and 78 for each of the rods and the guide rings may therefore slide on the rods as the shutters are moved under the influence of the reamers or the springs.

As has been stated, the cups are successively moved into operative relation with the reamers and during the movement the cups are successively moved into position to receive the fruit. As a means for cutting the fruit and delivering it to the cups a chute 79 is arranged on an incline so that fruit gravitates from a suitable source of supply to a position for delivering fruit to the cups. In order to control the delivery of fruit, a wheel 80 is mounted on a shaft 81, which shaft is driven in synchronism with the drive that rotates the cups, as will presently appear. The wheel has bifurcated arms 82 that engage the successive fruit and force it past a knife 83 which is located in the chute. By reason of the fact that the arms are bifurcated, a clearance is provided whereby the arms move past the knife, one of the furcations of course being on each side of the knife. Preferably, the knife has an irregular cutting edge with points 84 which initially penetrate the skin of the fruit and this prevents crushing or distortion of the skin and insures a clean cut as the fruit is moved down the chute. The fruit, during its movement, is cut in half and passes down so that the halves of the fruit are engaged by the flippers 85 and 86, each of which is oscillatably mounted on a crank shaft such as 87. A plate 88 is slidable in suitable guides 89 and 90 and the said plate has an external stud 91 engaged by a lever 92, which lever is fulcrumed at 93 so that during the oscillation of the lever the plate is reciprocated. The plate has a horizontally disposed slot 94 on its inner surface and the slot is occupied by cranks 95 of the crank shaft 87. As the plate reciprocates, the cranks oscillate and this serves to turn the crank shafts a quarter of a revolution and by this means the fruit is forced outwardly by the flippers 85 and 86 so that the fruit is delivered to the cups. The flippers operate against the action of a spring 96 which holds the guards 97 and 98 in normal position to retain the halves of the fruit in operative relation to the flippers. The guards are supported by shafts such as 99 partially rotatable in bearings 100 on the external surface of the chute, and the spring extends from one angular projection of a shaft 99 to the other and tends to hold the guards in the position in which they are shown in Fig. 6.

The flippers also are provided with curved shelves or supports 101 on which the fruit is lodged and supported before the flippers are actuated to pass the fruit into the cups. The feed wheel 80 for the fruit and the lever 92 is oscillated in time for the successive operation of cutting the fruit and delivering it to the cups. To the end that the lever may be oscillated, a thrust rod 102 has a wheel 103 engaging the cam 53 so that as the cam is rotated, the lever 92 is oscillated. A spring 104 operates in conjunction with the thrust rod to hold the wheel thereof in engagement with the cam. The feed shaft 81 is rotated intermittently through a sprocket chain 105 which engages a sprocket wheel on the feed shaft 81 and a sprocket wheel 106 on the shaft 60.

In a cycle of operation, the fruit cups are stationary at a time when the reamers are moved upwardly and, when the fruit cups are stationary, the thrust rod is operated to actuate the flippers and deliver fruit to the empty cups at the top of the machine. The Geneva wheel is so arranged that after the reamers have descended, the wheel carrying the cups has motion imparted to it and the feed wheel 80 is operated to force another fruit past the knives into position to be delivered to the cups when they are again at rest. The fruit skin is dislodged from the reamer as it descends, since the shutters hold the skin and strip it from the reamer. The fruit skin is then carried approximately a quarter turn of the wheel and is discharged from the cups through an opening 107 in the breast plate which communicates with the chute 52.

Figure 12:
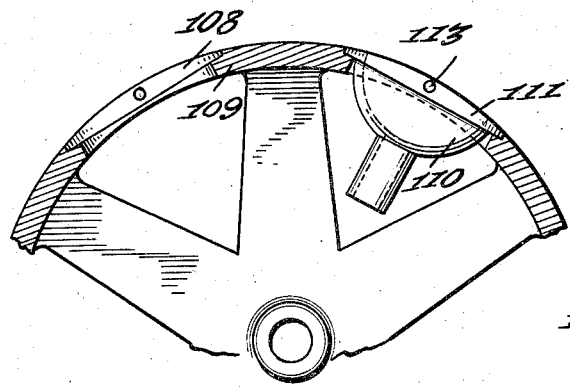
Figure 12 illustrates a view in elevation of a modified fruit cup and holder.
Figure 14:
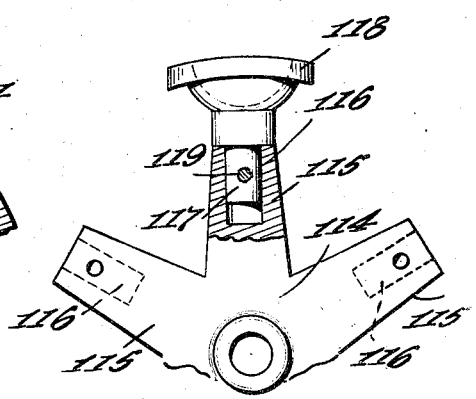
Figure 14 illustrates a view in elevation, partly in section, of a further modification.
Figure 13:
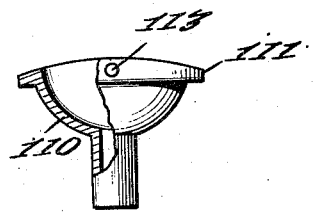
Figure 13 illustrates a sectional view of one of the fruit cups, partly in elevation.

In Figures 12, 13 and 14, modifications of cups are illustrated.

In Figure 12 the wheel is shown as having a plurality of openings 108 with flanged seats 109, and the cup 110 has an external flange 111 fitting in the seat of the opening 108 and they may be held in place by set screws 113 binding the wheel at the flange 112.

In the form illustrated in Figure 14 the wheel 114 has spokes 115 with seats 116 in each of which a shank 117 of a cup 118 is secured by a fastening 119 such as a set screw or the like. By this means the cups are removably secured in place and the cups may be of different sizes to operate in conjunction with fruit of different diameters. The external arrangement of the graduated cups will be the same so that they will fit wheels for which they are intended, the only difference being that the cups are smaller or larger, as stated.

Internally of the housing a suitable sprinkling system is provided and, in the present embodiment, a water supply pipe 120 is connected with the system, generally identified by the reference numeral 121, and to the sprinklers 122. This provision of means for flushing or flooding the parts of the apparatus in which the juices escape from the fruit furnishes a supply of water which may be used by an operator in maintaining the operating parts of the apparatus in a sanitary condition.

In Figure 18 the chute 123 has a slotted bottom in which the blades 124 are movable, the blades radiating from a hub on the shaft 125. The shaft 125 is journaled below the chute and the arrangement of parts is such that the straight blades serve to retard the descent of the fruit in the chute. The wheel is intermittently moved through suitable mechanism such as illustrated in the feeding device heretofore described and, owing to the fact that the blades are straight, they will act in conjunction with fruit of any size which the chute will accommodate. A sprocket wheel 126 on the shaft 125 is engaged by a sprocket chain 127 driven from the sprocket wheel 128 on the shaft 129 and the shaft is intermittently driven, as previously explained.

I claim:

1. In a fruit juice extractor, reamer shafts, reamers thereon, means for rotating the shafts, cams having peripheral grooves into which the shafts project, an anti-friction element on each shaft within a groove, power transmitting means for rotating the shafts and the cams, reamers on the shafts, a frame positioned above the reamers, shutters slidably supported in the frame, said shutters being arranged in pairs, the shutters of each pair having oppositely curved inner edges forming a clearance for the reamer therebelow as is rises, and means for delivering fruit to the shutters and holding it while the reamers are elevated.

2. In a fruit juice extractor, reamer shafts, reamers thereon, means for rotating the shafts, rotatably mounted cams having peripheral grooves into which the shafts extend, anti-friction elements on the shaft within the said groove, driving means for the shafts and cams, rotatably mounted cups, means intermittently actuated by the aforesaid driving means for intermittently moving the cups with relation to the reamers, means for supporting fruit carried by the cups when in operative relation to the reamers, means for intermittently delivering fruit to the cups, and means to prevent dislodgment of fruit from the cups as the cups move from the fruit receiving position to the reaming position.

3. In a fruit juice extractor, reamer shafts, reamers thereon, means for mounting the shafts for rotation and axial movement, means for rotating the shaft, means for moving the shaft axially while rotating, fruit carrying cups rotatably mounted above the reamers, means for intermittently moving the cups into and out of operative relation with the reamers, means for holding fruit in the cups while being subjected to the action of the reamers comprising a frame, rods supported by the frame, shutters arranged in pairs slidably supported by the rods, the said pairs of shutters each having oppositely curved edges forming clearances for the entrance of the reamers as they are moved upwardly, curved flanges on the curved edges of the shutters for producing a camming action of the reamers on the shutters, means for confining the fruit in the cups while the cups are in motion, the said means having an opening through which the fruit skins are discharged after the cups move from the reamer position.

NORVAL M. FAULDS.